OR  3,825,315

United States Patent
Altman et al.

[11] 3,825,315
[45] July 23, 1974

[54] ZOOM LENS OPTICAL SYSTEM FOR INFRARED WAVELENGTHS

[76] Inventors: Richard M. Altman, 22216 Victory Blvd.; Jerome J. Rosenblatt, 20334 Alerion Pl., both of Woodland Hills, Calif. 91364

[22] Filed: Jan. 29, 1973

[21] Appl. No.: 327,516

[52] U.S. Cl............................. 350/2, 350/7, 350/42, 350/184, 350/192
[51] Int. Cl. ........................................... G02b 15/14
[58] Field of Search ............ 350/184, 186, 2, 42, 43

[56]         References Cited
         UNITED STATES PATENTS
1,091,933  3/1914  Humbrecht.......................... 350/42
3,433,559  3/1969  Vockenhuber ...................... 350/42
3,439,969  4/1969  Kirkpatrick........................... 350/2
3,679,293  2/1972  Baker.................................. 350/184

OTHER PUBLICATIONS
Jamieson "Zoom Lenses for the $8\mu$–$13\mu$ Waveband" Optica Acta, Vol. 18, No. 1, pages 17–30, 1971.

*Primary Examiner*—John K. Corbin
*Attorney, Agent, or Firm*—W. H. MacAllister, D. C. Keaveney

[57]         ABSTRACT
There is disclosed a zoom lens optical system suitable for use at infrared wavelengths comprising a fixed position front objective lens group and a variably positioned variator or zoom lens group both positioned along an optic axis and related in such a fashion that the variator lens means serves to relay a fixed position intermediate image formed by the objective lens means to the image surface or focal plane of the system which image is also fixed in position on the optic axis within design tolerance limits. The movement of the variator produces a continuous zoom effect in that the focal length of the system is different for each different position of the variator lens. Such a zoom lens is particularly adapted for, but not restricted in use to, optical systems for forming an image at infrared wavelengths. Such infrared systems include a detector array positioned at the second image or focal surface with a scanning device such as a mirror and an aperture stop between this array and the variator lens. The detector array must be multiplexed due to the scanning technique which in turn must be such as to accommodate the response time of the infrared detector. The resulting problem of aperture scanning or loss of part of the image forming beam by vignetting or the like which occurs in such infrared systems is overcome by designing the foregoing lens arrangement to position the entrance pupil of the system at the front surface of the objective lens for any position of the variator lens as a starting design point. Specific lens constructional parameters are given for two exemplary embodiments.

9 Claims, 2 Drawing Figures

ZOOM LENS OPTICAL SYSTEM FOR INFRARED WAVELENGTHS

BACKGROUND OF THE INVENTION

1. Field of the Invention

This invention relates to variable focal length or zoom lens systems and more particularly to such a lens system which is suitable for use in an infrared imaging system. The term "infrared" is here used to refer to electromagnetic radiation having a wavelength longer than visible radiation and shorter than microwave radiation. The numerical wavelength range of the infrared is usually considered to extend from 0.7 microns which is the longest visible wavelength to substantially 1000 microns. Any particular system will, of course, be designed for operation in a predetermined wavelength range within this region of the spectrum which is considerably narrower than the entire region.

The optics of infrared radiation is similar in principle and in many, but not all, of the details to the conventional optics of the visible region. The wavelength of infrared radiation while appreciably greater than that of the visible, is still small in comparison with the gross dimensions of the optical system. Therefore, many of the design principles and techniques of visible optics are directly applicable to the infrared. Conversely, where, as in the present case, problems unique to infrared systems are solved, the solutions are also applicable in general principle to the visible region.

The chief differences between infrared optical and visible optical system designs lie in two areas. First, many materials which are transparent in the visible are not transparent throughout the infrared. By the same token, there are other materials which exhibit useful transmission in various regions in the infrared which are not transparent in the visible. The second factor of difference for infrared optical systems is due to the magnitude of the wavelength of the radiation. Limitations in imaging characteristics due to diffraction effects are functions of the wavelength of the radiation. This situation results in both advantage and disadvantage over that for visible optics. One of the problems it creates for infrared systems using scanning devices such as a scanning mirror is what is commonly referred to as "aperture scanning" as will be explained below.

The formation of two dimensional images in the infrared may be accomplished, as in the visible, by refracting elements, by reflecting elements, or by combination of both. Except where near-infrared sensitive photographic film is used, the image will be observed by a detector element or elements. The characteristics of the image must then be related to the requirements of the detector system including its response time.

These considerations have resulted in prior art infrared imaging systems wherein the image from a fixed focal length lens system is reflected by an oscillating plane scanning mirror which oscillates about a vertical axis so as to scan the image horizontally across a vertically extending detector array. These systems are thus able to multiplex the detector so that at any given instant the entire detector array is reading out and converting to electrical signals a vertical line segment of the entire image which is being horizontally scanned across the detector array.

It has not heretofor been possible to obtain a variable focal length lens system for such infrared imaging devices. One of the problems which has impeded this development has been the above-noted "aperture scanning" effect. By this is meant that the lens system must be so designed that as the scanning mirror moves the entire image must always remain within the clear aperture of the system in order to avoid vignetting. This requirement is far more severe in the infrared region than it would be in an analogous system designed for operation in the visible region by virtue of the above-noted diffraction effects. That is to say, if the lens mounts at the edges of the lenses obstruct any portion of the rays forming the image for any position of the scanning mirror, a vignetting type of phenomenon will materially degrade the infrared image to a degree much greater than would be the case for an image at visible wavelengths. It has heretofor been possible to design around the "aperture scanning" problem for fixed focal length infrared imaging systems, but heretofor no variable focal length or zoom system has been known which could be used with infrared imaging systems, particularly such systems using a scanning mirror.

2. Prior Art

Variable focal length or zoom lens systems for the visible wavelength region have, of course, been known for many years. Typical of such systems are those disclosed in U.S. Pat. No. 3,216,319 and U.S. Pat. No. 3,433,559.

Illustrative of one problem which is shared by zoom systems in both the visible and infrared region is the disclosure in U.S. Pat. No. 3,658,411. As a matter of practical design for intended surveillance application, most infrared systems of either fixed or variable focal length must have their optic axis folded not only at the scanning mirror but also at other points in the system. The above-noted U.S. Pat. No. 3,658,411 issued on Apr. 25, 1972 to William H. Price of the Eastman Kodak Company discloses a foldable zoom lens system suitable for use in the visible region of the spectrum, but does not discuss its applicability to the infrared.

A few attempts at zoom lens systems for other than the primary visible region of the spectrum have been made. U.S. Pat. No. 3,517,979 issued June 30, 1970 to Lowenthl discloses a variable magnification lens system for use in the near ultraviolet light range. On the other hand, U.S. Pat. No. 3,396,397 issued Aug. 6, 1968 to Kott discloses a dielectric zoom lens for use in microwave beam scanning at wavelengths greater than 1000 microns. Neither of these systems, nor any of the systems intended for use in the visible region, either encounters or solves the problems noted above which are peculiar to the infrared.

SUMMARY OF THE INVENTION

It is therefore an object of the present invention to provide a zoom lens optical system for use at infrared wavelengths.

Another object is to provide such a system wherein the spacing between the lens elements thereof is sufficiently large to permit the introduction of optical elements necessary to fold the optic axis of the system as desired in a particular mechanical configuration.

Another object is to provide a zoom lens system wherein at any wavelength image description due to aperture scanning is avoided for any focal length within the design zoom range.

Other objects will be apparent from the description to follow and from the appended claims.

These objects are accomplished according to the preferred embodiment of the present invention by a zoom lens optical system rendered operative at infrared wavelengths greater than 0.7 microns by fabricating all of the lens elements of the system from materials such as germanium and zinc selenide which have useful transmittances of infrared radiation at the design wavelengths. Zinc selenide lens materials are sold by the Eastman Kodak Company under the trademark "Irtran 4". The high indices of refraction (greater than 2.0) for such materials make it possible to accomplish more optically with fewer lenses and the fact that such imaging systems are passive in the sense that they depend upon object emitted infrared radiation makes it mandatory to minimize the number of optical elements in order to reduce transmission losses. The system thus preferably comprises a three lens element fixed position objective lens means which forms a first or intermediate image of the object at a fixed position on the optic axis. This image may be either real or virtual depending upon the position setting of the variator lens element. The three lens variator element which is interposed between the objective and the aperture stop of the system acts to relay this first or intermediate image to form a second or final image at the focal surface which is the surface of the infrared radiation detector. The scanning mirror must be positioned between the last moving optical element and the detector. The variator lens means or lens group (by which term is herein meant all of the movable lenses the motion of which serves to vary the focal length of the system) is positioned for motion along the segment of the optic axis lying between the aperture stop and the first image and in any of its positions acts to relay the first image to the detector focal surface. The problem of aperture scanning is solved by designing the lens system so as to position the entrance pupil of the system substantially at the front surface of the objective lens means for the long focal length position of the variator lens means. The reduction of aperture scanning is accomplished by making the lenses large enough to pass all the image beam. Placing the pupil at the front lens minimizes the size of the lens required. Control of the pupil position to keep it within one focal length of the front objective lens has been maintained through the entire zoom range in order to keep the lenses at their smallest diameter.

BRIEF DESCRIPTION OF THE DRAWINGS

In the detailed description of the preferred embodiment reference is made to the accompanying drawings in which like reference characters refer to like parts throughout and wherein.

Figure 1:
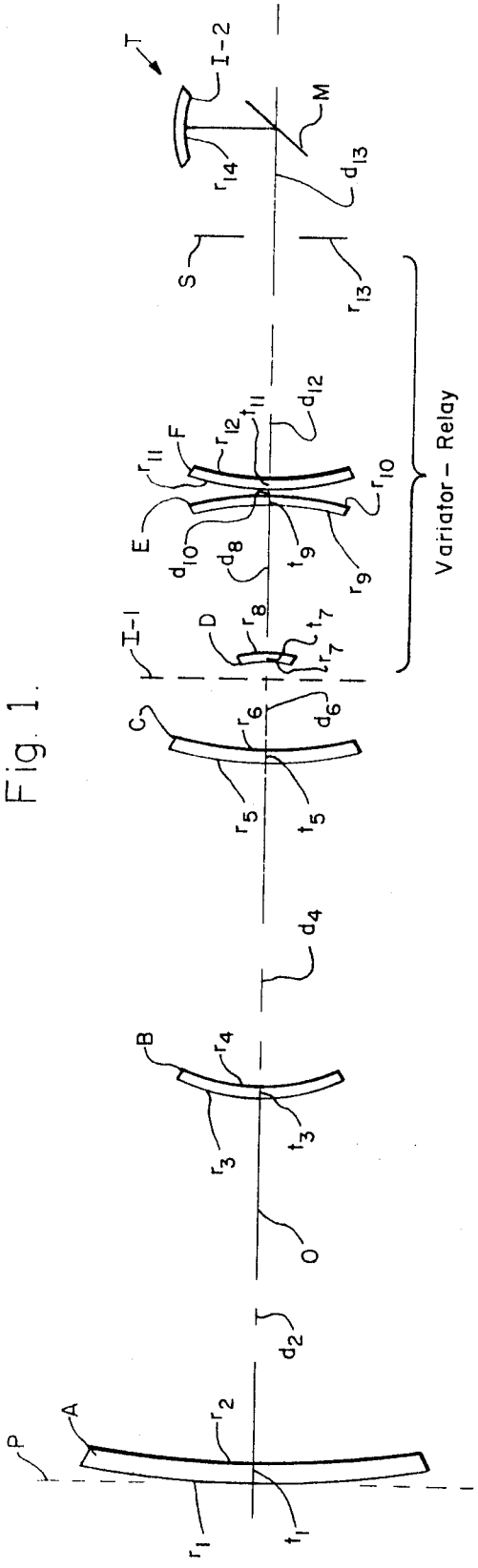
FIG. 1 is a diagrammatic illustration of the optical configuration of a zoom lens system in accordance with the present invention.

Turning now to the drawings, there is shown in FIG. 1 a diagrammatic illustration of the optical configuration of a zoom lens in accordance with the present invention. The elements of the system are positioned along an optic axis O which may be folded at a scanning mirror M, as shown, and at any other points necessary to meet the packaging requirements of a particular system. The objective lens group of the system comprises the three fixed position front lenses A, B, and C which, in that order, first receive radiation from an object to be imaged and bring this radiation to focus to form a first real or virtual image I-1. The three lenses D, E, and F are mounted in any convenient means for motion along the optic axis and comprise the variator lens group of the system. These lenses in any of their positions lie on the optic axis between the lens element C and the aperture stop S of the system. The scanning mirror M is mounted for oscillation about a vertical axis perpendicular to the plane of the drawing at the point where the optic axis intersects the plane of the mirror M which serves both as a scanning and folding mirror. The variator lens in any of its positions forms a second or final image I-2 on the surface of the detector or transducer T. In this system the surface of the detector T is a segment of the surface of a sphere and the array elements are disposed along that surface in a direction extending in the plane also containing the axis of oscillation of the mirror M.

The entrance pupil of the optical system is, in accordance with the standard definition, the image of the aperture stop of the system as seen from the input end of the instrument. The lenses in the present system are so configured that for the long focal length position of the variator lenses the entrance pupil lies in a plane P which is substantially tangent to the center of the front surface of the front objective lens A. For each position of the variator lens group the system will, of course, have a different focal length. In one of the examples to be discussed below, the range variation of the focal length is approximately from 8 to 40 inches; in the second it is about 6.6 to 32.0 inches. For any of these focal length determining positions the plane of the entrance pupil P and the surface of the image I-2 is substantially fixed in position within the limits of design tolerance. The position of the intermediate image I-1 is, of course, fixed for any focal length since the lenses A, B, and C are focused for an object at infinity or at the hyperfocal object distance in the intended surveillance uses and are fixed in position relative to the optic axis and the other fixed elements here comprising the aperture stop S and detector T.

In accordance with conventional practice the radius of curvature of the lens elements will be said to be positive if the center of curvature lies to the right of the lens and will be said to be negative if the center of curvature lies to the left of the lens along the optic axis. Since the lenses are positioned in air which has a lower refractive index than the lens, a lens is converging if thicker at the center than at the edges and is diverging in the opposite case. It will be noted in FIG. 1 that each of the three fixed position objective lenses A, B, and C are meniscus lenses having both surfaces positive, lenses A and C converging whereas lens B is diverging. The first two of the variator lenses D and E are meniscus lenses having both surfaces negative whereas lens F is a meniscus with both surfaces positive. Lens D is diverging and lenses E and F are converging.

Figure 2:
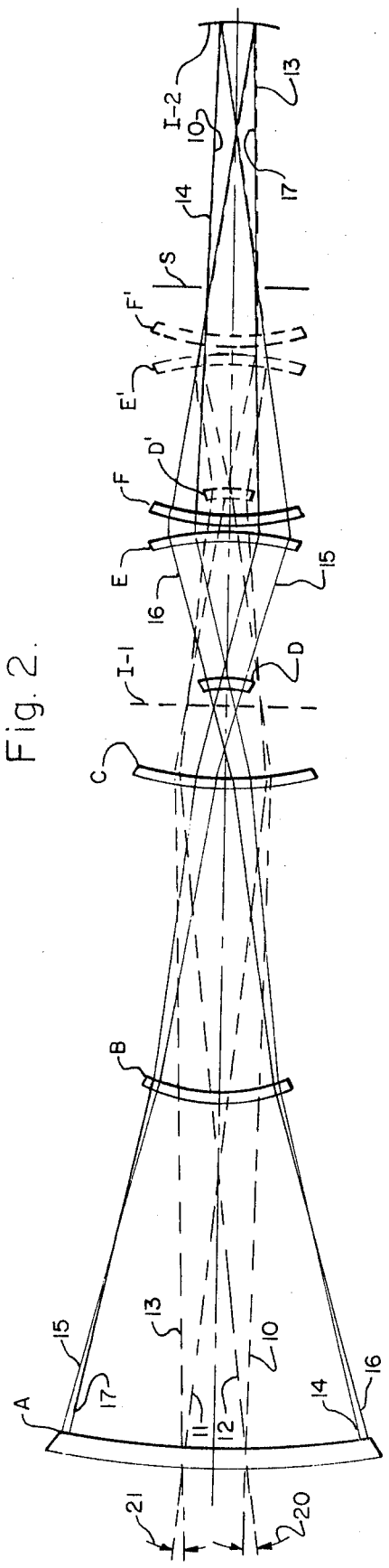
FIG. 2 is a schematic representation of a lens system for illustrating the parameters used in designing one or more variable focal length systems embodying the invention. Tables 1A and 1B of the specification give the parameters for a first specific example of such a system whereas Tables 2A and 2B of the specification give the parameters for a second specific example of such a system.

There is shown in FIG. 2 a schematic representation of the system of FIG. 1 which is designed to function in the 8 to 14 micron region of infrared spectrum and to provide therein a continuous zoom optical system commensurate with infrared image conversion detectors. In order to maintain sensitivity for such a system it is necessary to use only a limited number of optical elements which are here shown as 6. In order to avoid aperture scanning and still keep the front element or lens A of the system to a reasonable diameter which can be physically realized, it is necessary to have the entrance pupil P at or close to the front surface of this element. Also, the zoom optical system in order to be practical has to be restricted in overall length and sufficient space between the lenses must be provided to permit folding in locations other than the single fold at mirror M which is shown.

In FIG. 1 the front objective lens A is shown having a central thickness $t_1$ along the optic axis O. Similarly, lens B has a thickness $t_3$, lens C has a thickness $t_5$, lens D has a thickness $t_7$, lens E has a thickness $t_9$ and lens F has a thickness $t_{11}$. The surfaces of each of the lenses are indicated by the reference character r with an appropriate subscript. The lens surfaces are portions of surfaces of revolution of a conic section as is usual in the art. Most of the lens surfaces are portions of a sphere. Certain of the surfaces are positions of a parabolic surface of revolution as will be specified in the tables below. The radius of curvature of the spherical lenses is, of course, simply the radius of the sphere. Where a parabolic lens surface is used, the radius of curvature is the quantity r in the equation for the parabola stated as $y^2 = 2rx$.

In FIG. 1 it will be noted that the front surface of lens A is designated $r_1$ and the rear surface is designated $r_2$. Similarly, lens B has a front $r_3$ and a rear surface $r_4$, lens C has a front surface $r_5$ and a rear surface $r_6$, lens D has a front surface $r_7$ and a rear surface $r_8$, lens E has a front surface $r_9$ and a rear surface $r_{10}$, and lens F has a front surface $r_{11}$ and a rear surface $r_{12}$. It will be noted that in FIG. 2 lenses D, E, and F, the variator lenses are shown both in a solid line position to establish one focal length for the system and in a dashed line position wherein primes are applied to their reference characters to establish another focal length for the system. The illustrative rays 10, 12, 11 and 13 are applicable to the dashed line position whereas the illustrative raYs 14, 16, 15, and 17 are applicable to the solid line position as will be explained below. For any position of the fixed and movable lenses the distances between surfaces of the lenses along the optic axis are specified by the reference character d with an appropriate subscript. Thus, the distance between the surface $r_2$ and the surface $r_3$ is indicated as $d_2$; the distance between $r_4$ and $r_5$ is $d_5$, the distance between $r_6$ and $r_7$ is $d_6$; the distance between $r_8$ and $r_9$ is $d_8$; the distance between $r_{10}$ and $r_{11}$ is $d_{10}$; the distance between $r_{12}$ and the surface $r_{13}$ of the fixed position aperture stop S is $d_{12}$; and the distance between the surface $r_{13}$ of the stop S and the surface $r_{14}$ of the second image surface I-2 of detector T is $d_{13}$. The specific values for the curvatures, r, the thicknesses, t, and the distances, d, will of course differ in different embodiments of the systems. Specific values for two preferred embodiments are given in the tables below. These tables include the ranges of values applicable to the distances $d_6$, $d_8$, $d_{10}$, and $d_{12}$, all or some of which may vary with the motion of the variator lenses to produce differing focal lengths for a particular system.

Before considering the numerical parameters of specific embodiments, it should be noted in FIG. 2 that the solid line position of the variator lenses D, E, and F produces a relatively long focal length narrow angle of view system as is illustrated by the passage of typical ray pairs 14, 16, and 15, 17 which pass through the lens D in its solid line position. On the other hand, the dashed line position of lens D produces a relatively wide angle short focal length system. In this position of the variator lenses the typical ray pairs 10, 12, and 11, 13 pass through the lens D in its position D'. The "wide angle" referred to is the angle 20 between the rays 10 and 12 and the corresponding angle 21 between the rays 11 and 13 coming from elements of an object at infinity. This angle in this position has a value of approximately 5°. The corresponding angle (not shown because of its size) between the elongation of rays 14 and 16 or 15 and 17 would be only about 1°. The paths of these nonparaxial rays through the system may be traced to illustrate the manner in which they become coincident in defining an image on the second image surface I-2 within the field of view defined by the aperture stop S for both illustrated positions of the variator. The fact that these rays will coincide so that an image will be formed at the same position on the detector rays surface I-2 for any position of the variator relay within the design range of focal lengths is a characteristic of a "zoom" system wherein the aperture stop is the exit pupil as shown herein.

In a first specific embodiment of the system shown in FIG. 2 lenses A, B, C, E, and F are comprised of germanium having an index of refraction at the above-noted operating wavelengths approximately equal to 4.003 whereas lens D is comprised of zinc selenide having an index of refraction at the operating wavelengths approximately equal to 2.407. In Table 1A below, the values of the radii, the thicknesses, lens surface clear apertures, and the air distances between the lenses for an effective focal length of 40 inches are given in inches. All radii of curvature refer to spherical lens surfaces except $r_1$ and $r_{11}$ which are parabolic.

Table 1B gives spacings for other focal lengths. Table 2A and 2B gives analogous information for a second specific embodiment.

TABLE 1A

| LENS | PARAMETER | INCHES | MIN. CLEAR APERTURES |
|---|---|---|---|
| A | $r_1$ | 24.769 | 8.200 |
|  | $t_1$ | .523 |  |
|  | $r_2$ | 56.244 | 8.112 |
|  | $d_2$ | 8.618 |  |
| B | $r_3$ | 6.001 | 3.472 |
|  | $t_3$ | .199 |  |
|  | $r_4$ | 4.970 | 3.336 |
|  | $d_4$ | 7.806 |  |
| C | $r_5$ | 7.172 | 4.606 Az. |
|  |  |  | 2.736 El. |
|  | $t_5$ | .247 |  |
|  | $r_6$ | 12.959 | 4.575 Az. |
|  |  |  | 2.688 El. |
|  | $d_6$ | 2.412 |  |
| D | $r_7$ | − 1.588 | 1.308 |
|  | $t_7$ | .110 |  |
|  | $r_8$ | − 3.434 | 1.395 |
|  | $d_8$ | 3.819 |  |
| E | $r_9$ | −13.831 | 4.032 |
|  | $t_9$ | .294 |  |
|  | $r_{10}$ | − 7.169 | 4.088 |
|  | $d_{10}$ | .023 |  |
| F | $r_{11}$ | 9.913 | 4.040 |
|  | $t_{11}$ | .301 |  |
|  | $r_{12}$ | 13.471 | 3.960 |

TABLE 1A-Continued

| LENS | PARAMETER | INCHES | MIN. CLEAR APERTURES |
|---|---|---|---|
| Stop | $d_{12}$ | 6.231 | |
| | $r_{13}$ | 0 | |
| 1-2 Focal | $d_{13}$ | 6.785 | |
| | $r_{14}$ | − 6.785 Az. | |
| Surface | | − 9.6 El. | |

TABLE 2A

| LENS | PARAMETER | INCHES | MIN. CLEAR APERTURES |
|---|---|---|---|
| A | $r_1$ | 21.610332 | 3.316 |
| | $t_1$ | 0.337821 | |
| | $r_2$ | 49.885661 | 3.295 |
| | $d_2$ | 7.341852 | |
| B | $r_3$ | 3.384925 | 1.546 |
| | $t_3$ | 0.173662 | |
| | $r_4$ | 2.904397 | 1.481 |
| | $d_4$ | 5.899393 | |
| C | $r_5$ | 6.415104 | 2.620 |
| | $t_5$ | 0.369492 | |
| | $r_6$ | 10.791309 | 2.585 |
| | $d_6$ | 5.891462 | |
| D | $r_7$ | − 1.523767 | .770 |
| | $t_7$ | 0.110347 | |
| | $r_8$ | − 2.751681 | .819 |
| | $d_8$ | 4.028136 | |
| E | $r_9$ | −11.342064 | 2.199 |
| | $t_9$ | 0.294850 | |
| | $r_{10}$ | − 7.273785 | 2.238 |
| | $d_{10}$ | 0.558604 | |
| F | $r_{11}$ | 10.908186 | 2.274 |
| | $t_{11}$ | 0.298679 | |
| | $r_{12}$ | 19.451797 | 2.246 |
| | $d_{12}$ | 1.702274 | |
| Stop | $r_{13}$ | 0.000000 | |
| | $d_{13}$ | 6.803485 | |
| 1-2 Focal | $r_{14}$ | − 8.200000 | |
| Surface | | | |

TABLE 1B

| EFL | EFFECTIVE FOCAL LENGTHS | | |
|---|---|---|---|
| | $d_6$ | $d_8$ | $d_{12}$ |
| 40.0 inches | 2.412 | 3.819 | 6.231 |
| 30.6 inches | 3.126 | 3.543 | 5.794 |
| 23.3 inches | 3.909 | 3.393 | 5.161 |
| 17.889 inches | 4.736 | 3.348 | 4.379 |
| 13.6 inches | 5.568 | 3.402 | 3.493 |
| 10.4 inches | 6.354 | 3.561 | 2.548 |
| 8.00 inches | 7.027 | 3.850 | 1.586 |

TABLE 2B

| EFL | EFFECTIVE FOCAL LENGTHS | | | |
|---|---|---|---|---|
| | $d_6$ | $d_8$ | $d_{10}$ | $d_{12}$ |
| 6.635" | 5.891" | 4.028" | .559" | 1.702" |
| 9.947" | 4.448" | 3.694" | 1.076" | 2.961" |
| 14.414" | 3.209" | 3.585" | 1.234" | 4.153" |
| 22.052" | 2.156" | 3.596" | .693" | 5.736" |
| 31.960" | 1.042" | 4.030" | .670" | 6.438" |

In Table 1B there is specified the effective focal lengths of the system at various exemplary positions of the variator lenses. In this embodiment variator lenses E and F move together so that $d_{10}$ remains constant at the values shown in Table 1A. Throughout the range of effective focal lengths, the system has a relative aperture or F number equal to 5. The minimum clear apertures of the individual lenses are shown in Table 2, 1A and 2A. Variation of focal length is continuous and may be determined from a graph plotted through the above values.

It will be noted that the effective focal length for the system whose parameters are given in Tables 1A and 1B varies from 8 inches to 40 inches for the values of $d_6$, $d_8$, and $d_{12}$ shown in the tables. Distance $d_{10}$ is not specified since lenses E and F move in unison. The second embodiment, whose parameters are given in Tables 2A and 2B, was designed to produce a variation in focal length from 6.6 inches to 31.9 inches. A similar configuration was used in both systems but lenses E and F move independently in the second embodiment and in unison in the first embodiment. In the second embodiment lenses A, C, E, and F were comprised of germanium having an index of refraction of 4.003 whereas lenses B and D were comprised of zinc selenide having an index of refraction of 2.407. All lens radii specified in Table 2A above are for spherical surfaces except $r_1$ and $r_{11}$ which are parabolic. The values of the parameters for this system are set forth in Table 2A above in similar fashion to Table 1A above and similarly the exemplary values of the variable spacings between lenses for various effective focal lengths are so set forth in Table 2B above.

It is thus seen that we have provided a lens system operative in the infrared wavelength regions and affording a continuously variable focal length or zoom operation.

What is claimed is:

1. A zoom lens optical system operative at infrared wavelengths greater than 0.7 microns, said system comprising a plurality of elements positioned along an optic axis to receive infrared radiation and including:
   a. infrared responsive detector means positioned to receive said radiation on an image surface of said detector;
   b. fixed position lens means, variably positioned lens means, and an aperture stop each positioned along said optic axis and coacting in any position of said variably positioned lens means to bring said received radiation to focus at said image surface of said detector, the effective focal length of said coacting lenses being different for each different position of said variably positioned lens means;
   c. all of the lens elements of said system being formed of materials having useful transmittance of infrared radiation at the design wavelengths, said fixed position lens means comprising the front objective element of said system which first receives said radiation and forms a first intermediate image at a predetermined fixed point on said optic axis, said variably positioned lens means comprising the variator element of said system and functioning to relay said first image to form a second real image focused at said detector, the position of said second real image at said detector being substantially fixed within design tolerance limits for any position of said variator lens;
   d. a movable scanning mirror positioned on said optic axis substantially at said aperture stop and between the last moving lens element and said detector image surface, said image surface being a portion of a surface of symmetry about said optic axis;
   e. said variably positioned lens means being positioned between said fixed position front lens and said aperture stop; and f. the entrance pupil of said system (defined as the image of said aperture stop) for all positions of said variably positioned lens means lying within design tolerance limits of an optimum position which coincides with the front surface of said front lens of said system to preclude distortion resulting from aperture scanning.

2. A zoom lens optical system as in claim 1 further characterized by:
   a. said infrared responsive detector means having an array of detector elements disposed in said surface at which an image is formed by said lens means;
   b. said optic axis passing through the center of said aperture stop and the center of said fixed lens means;
   c. said detector image surface and said fixed position lens means being on opposite sides of said aperture stop along said optic axis;
   d. said variably positioned lens means having its center movable along a segment of said optic axis to vary the effective focal length of said system, said segment of said optic axis lying on the same side of said aperture stop as said fixed position lens means; and
   e. all of the lens elements of said system being formed of materials having indices of refraction greater than 2.0 and less than 5.0 and having sufficient transmittance of infrared radiation at wavelengths lying in a predetermined range of wavelengths all of which are greater than 0.7 microns to form said image on said detector image surface.

3. A zoom lens optical system as in claim 2 and further characterized by:
   a. the spacing between at least two pairs of adjacent lens elements of said system for all positions of said variably positioned lens means along said optic axis being sufficient to accommodate a folding mirror between the lens of each of said two pairs of adjacent lenses.

4. A zoom lens optical system as in claim 1 and further characterized by:
   a. said fixed position lens means comprising three individual lenses and said variably positioned lens means comprising three individual lenses; and
   b. at least one lens in each of said groups of lenses being formed of a material having an index of refraction at least equal to 4.0 and all of the remaining lenses being formed of a material having an index of refraction at least equal to 2.4.

5. A zoom lens optical system as in claim 4 wherein said three fixed position lens means includes lenses A, B and C of said system and said three variably positioned lens means includes lenses D, E and F of said system, said lenses being fabricated in accordance with the following construction tables wherein the parameter symbols $r$, $t$ and $d$ are respectively lens surface curvature radii, $r$, lens thickness, $t$, and lens surface separation, $d$, along the optic axis, the particular parametric quantity being indicated by subscript and referring to the quantity indicated by the corresponding symbol in FIG. 1:

TABLE 1A

| LENS | PARAMETER | INCHES | MIN. CLEAR APERTURES |
|---|---|---|---|
| A | $r_1$ | 24.769 | 8.200 |
|   | $t_1$ | .523 |  |
|   | $r_2$ | 56.244 | 8.112 |
|   | $d_2$ | 8.618 |  |
| B | $r_3$ | 6.001 | 3.472 |
|   | $t_3$ | .199 |  |
|   | $r_4$ | 4.970 | 3.336 |
|   | $d_4$ | 7.806 |  |
| C | $r_5$ | 7.172 | 4.606 Az. 2.736 El. |
|   | $t_5$ | .247 |  |
|   | $r_6$ | 12.959 | 4.575 Az. 2.688 El. |
|   | $d_6$ | 2.412 |  |
| D | $r_7$ | −1.588 | 1.308 |
|   | $t_7$ | .110 |  |
|   | $r_8$ | −3.434 | 1.395 |
|   | $d_8$ | 3.819 |  |
| E | $r_9$ | −13.831 | 4.032 |
|   | $t_9$ | .294 |  |
|   | $r_{10}$ | −7.169 | 4.088 |
|   | $d_{10}$ | .023 |  |
| F | $r_{11}$ | 9.913 | 4.040 |
|   | $t_{11}$ | .301 |  |
|   | $r_{12}$ | 13.471 | 3.960 |
|   | $d_{12}$ | 6.231 |  |
| Stop | $r_{13}$ | 0 |  |
|   | $d_{13}$ | 6.785 |  |
| I-2 Focal Surface | $r_{14}$ | −6.785 Az. −9.6 El. |  |

TABLE 1B

| EFL (inches) | EFFECTIVE FOCAL LENGTHS | | |
|---|---|---|---|
|  | $d_0$ | $d_8$ | $d_{12}$ |
| 40.0 | 2.412 | 3.819 | 6.231 |
| 30.6 | 3.126 | 3.543 | 5.794 |
| 23.3 | 3.909 | 3.393 | 5.161 |
| 17.889 | 4.736 | 3.348 | 4.379 |
| 13.6 | 5.568 | 3.402 | 3.493 |
| 10.4 | 6.354 | 3.561 | 2.548 |
| 8.00 | 7.027 | 3.850 | 1.586 | and wherein lenses A, B, C, E and F are comprised of germanium having an index of refraction of 4.003 and lens D is comprised of zinc selenide having an index of refraction of 2.407; $r_1$ and $r_{11}$ being radii of parabolic surfaces and all other radii being of spherical surfaces.

6. A zoom lens optical system as in claim 4 wherein said three fixed position lens means includes lenses A, B and C of said system and said three variably positioned lens means includes lenses D, E and F of said system, said lenses being fabricated in accordance with the following construction tables wherein the parameter symbols $r$, $t$ and $d$ are respectively lens surface curvature radii, $r$, lens thickness, $t$, and lens surface separation, $d$, along the optic axis, the particular parametric quantity being indicated by subscript and referring to the quantity indicated by the corresponding symbol in FIG. 1:

TABLE 2A

| LENS | PARAMETER | INCHES | MIN. CLEAR APERTURES |
|---|---|---|---|
| A | $r_1$ | 21.610332 | 3.316 |
|   | $t_1$ | 0.337821 |  |
|   | $r_2$ | 49.885661 | 3.295 |

TABLE 2A-Continued

| LENS | PARAMETER | INCHES | MIN. CLEAR APERTURES |
|---|---|---|---|
|  | $d_2$ | 7.341852 |  |
| B | $r_3$ | 3.384925 | 1.546 |
|  | $t_3$ | 0.173662 |  |
|  | $r_4$ | 2.904397 | 1.481 |
|  | $d_4$ | 5.899393 |  |
| C | $r_5$ | 6.415104 | 2.620 |
|  | $t_5$ | 0.369492 |  |
|  | $r_6$ | 10.791309 | 2.585 |
|  | $d_6$ | 5.891462 |  |
| D | $r_7$ | − 1.523767 | .770 |
|  | $t_7$ | 0.110347 |  |
|  | $r_8$ | − 2.751681 | .819 |
|  | $d_8$ | 4.028136 |  |
| E | $r_9$ | −11.342064 | 2.199 |
|  | $t_9$ | 0.294850 |  |
|  | $r_{10}$ | − 7.273785 | 2.238 |
|  | $d_{10}$ | 0.558604 |  |
| F | $r_{11}$ | 10.908186 | 2.274 |
|  | $t_{11}$ | 0.298679 |  |
|  | $r_{12}$ | 19.451797 | 2.246 |
|  | $d_{12}$ | 1.702274 |  |
| Stop | $r_{13}$ | 0.000000 |  |
|  | $d_{13}$ | 6.803485 |  |
| 1-2 Focal Surface | $r_{14}$ | − 8.200000 |  |

TABLE 2B

| EFL | EFFECTIVE FOCAL LENGTHS | | | |
|---|---|---|---|---|
|  | $d_6$ | $d_8$ | $d_{10}$ | $d_{12}$ |
| 6.635" | 5.891" | 4.028" | .559" | 1.702" |
| 9.947" | 4.448" | 3.694" | 1.076" | 2.961" |
| 14.414" | 3.209" | 3.585" | 1.234" | 4.153" |
| 22.052" | 2.156" | 3.596" | .693" | 5.736" |
| 31.960" | 1.042" | 4.030" | .670" | 6.438" | and wherein lenses A, C, E and F were comprised of germanium having an index of refraction of 4.003 and lenses B and D were comprised of zinc selenide having an index of refraction of 2.407; $r_1$ and $r_{11}$ being radii of parabolic surfaces and all other radii being of spherical surfaces.

7. In a zoom lens optical system of the type which is operative at infrared wavelengths greater than 0.7 microns and which includes a detector on which an image is formed and a scanning mirror to obtain the observed field of view of said image:

a fixed position front objective lens means, variator lens means and an aperture stop sequentially positioned on an optic axis and optically related so as to position the aperture stop at said scanning mirror and the entrance pupil of said system substantially at the front surface of said objective lens means for the long focal length position of said variator lens means, the effective focal length of said system being different for each different position of said variator means, and said entrance pupil remaining within one focal length of said front surface of said objective lens means for any focal length of the system in order to preclude aperture scanning in said system.

8. A zoom lens optical system as in claim 7 wherein said front objective lens means includes lenses A, B and C of said system and said variator lens means includes lenses D, E and F of said system, said lenses being fabricated in accordance with the following construction tables wherein the parameter symbols $r$, $t$ and $d$ are respectively lens surface curvature radii, $r$, lens thickness, $t$, and lens surface separation, $d$, along the optic axis, the particular parametric quantity being indicated by subscript and referring to the quantity indicated by the corresponding symbol in FIG. 1:

PARAMETER TABLE 1A

| LENS | PARAMETER | INCHES | MIN. CLEAR APERTURES |
|---|---|---|---|
| A | $r_1$ | 24.769 | 8.200 |
|  | $t_1$ | .523 |  |
|  | $r_2$ | 56.244 | 8.112 |
|  | $d_2$ | 8.618 |  |
| B | $r_3$ | 6.001 | 3.472 |
|  | $t_3$ | .199 |  |
|  | $r_4$ | 4.970 | 3.336 |
|  | $d_4$ | 7.806 |  |
| C | $r_5$ | 7.172 | 4.606 Az. 2.736 El. |
|  | $t_5$ | .247 |  |
|  | $r_6$ | 12.959 | 4.575 Az. 2.688 El. |
|  | $d_6$ | 2.412 |  |
| D | $r_7$ | − 1.588 | 1.308 |
|  | $t_7$ | .110 |  |
|  | $r_8$ | − 3.434 | 1.395 |
|  | $d_8$ | 3.819 |  |
| E | $r_9$ | −13.831 | 4.032 |
|  | $t_9$ | .294 |  |
|  | $r_{10}$ | − 7.169 | 4.088 |
|  | $d_{10}$ | .023 |  |
| F | $r_{11}$ | 9.913 | 4.040 |
|  | $t_{11}$ | .301 |  |
|  | $r_{12}$ | 13.471 | 3.960 |
|  | $d_{12}$ | 6.231 |  |
| Stop | $r_{13}$ | 0 |  |
|  | $d_{13}$ | 6.785 |  |
| 1-2 Focal Surface | $r_{14}$ | − 6.785 Az. − 9.6 El. |  |

TABLE 1B

| EFL (inches) | EFFECTIVE FOCAL LENGTHS | | |
|---|---|---|---|
|  | $d_6$ | $d_8$ | $d_{12}$ |
| 40.0 | 2.412 | 3.819 | 6.231 |
| 30.6 | 3.126 | 3.543 | 5.794 |
| 23.3 | 3.909 | 3.393 | 5.161 |
| 17.889 | 4.736 | 3.348 | 4.379 |
| 13.6 | 5.568 | 3.402 | 3.493 |
| 10.4 | 6.354 | 3.561 | 2.548 |
| 8.00 | 7.027 | 3.850 | 1.586 | and wherein lenses A, B, C, E, and F are comprised of germanium having an index of refraction of 4.003 and lens D is comprised of zinc selenide having an index of refraction of 2.407; $r_1$ and $r_{11}$ being radii of parabolic surfaces and all other radii being of spherical surfaces.

9. A zoom lens optical system as in claim 7 wherein said front objective lens means includes lenses A, B and C of said system and wherein said variator lens means includes lenses D, E and F of said system, said lens being fabricated in accordance with the following construction tables wherein the parameter symbols $r$, $t$ and $d$ are respectively lens surface curvature radii, $r$, lens thickness, $t$, and lens surface separation, $d$, along the optic axis, the particular parametric quantity being indicated by subscript and referring to the quantity indicated by the corresponding symbol in FIG. 1:

TABLE 2A

| LENS | PARAMETER | INCHES | MIN. CLEAR APERTURES |
|------|-----------|--------|----------------------|
| A | $r_1$ | 21.610332 | 3.316 |
|   | $t_1$ | 0.337821 | |
|   | $r_2$ | 49.885661 | 3.295 |
|   | $d_2$ | 7.341852 | |
| B | $r_3$ | 3.384925 | 1.546 |
|   | $t_3$ | 0.173662 | |
|   | $r_4$ | 2.904397 | 1.481 |
|   | $d_4$ | 5.899393 | |
| C | $r_5$ | 6.415104 | 2.620 |
|   | $t_5$ | 0.369492 | |
|   | $r_6$ | 10.791309 | 2.585 |
|   | $d_6$ | 5.891462 | |
| D | $r_7$ | −1.523767 | .770 |
|   | $t_7$ | 0.110347 | |
|   | $r_8$ | −2.751681 | .819 |
|   | $d_8$ | 4.028136 | |
| E | $r_9$ | −11.342064 | 2.199 |
|   | $t_9$ | 0.294850 | |
|   | $r_{10}$ | −7.273785 | 2.238 |
|   | $d_{10}$ | 0.558604 | |
| F | $r_{11}$ | 10.908186 | 2.274 |
|   | $t_{11}$ | 0.298679 | |
|   | $r_{12}$ | 19.451797 | 2.246 |
| Stop | $d_{12}$ | 1.702274 | |
|   | $r_{13}$ | 0.000000 | |
|   | $d_{13}$ | 6.803485 | |
| I-2 Focal Surface | $r_{14}$ | −8.200000 | |

TABLE 2B

| | EFFECTIVE FOCAL LENGTHS | | | |
|---|---|---|---|---|
| EFL | $d_6$ | $d_8$ | $d_{10}$ | $d_{12}$ |
| 6.635″ | 5.891″ | 4.028″ | .559″ | 1.702″ |
| 9.947″ | 4.448″ | 3.694″ | 1.076″ | 2.961″ |
| 14.414″ | 3.209″ | 3.585″ | 1.234″ | 4.153″ |
| 22.052″ | 2.156″ | 3.596″ | .693″ | 5.736″ |
| 31.960″ | 1.042″ | 4.030″ | .670″ | 6.438″ | and wherein lenses A, C, E and F were comprised of germanium having an index of refraction of 4.003 and lenses B and D were comprised of zinc selenide having an index of refraction of 2.407; $r_1$ and $r_{11}$ being radii of parabolic surfaces and all other radii being of spherical surfaces.

* * * * *